(12) United States Patent
Yang et al.

(10) Patent No.: US 8,627,267 B2
(45) Date of Patent: Jan. 7, 2014

(54) APPARATUS AND METHOD FOR INITIALIZING SYSTEM GLOBAL VARIABLES BY USING MULTIPLE LOAD/STORE INSTRUCTIONS

(75) Inventors: Jin-Woo Yang, Ichon-shi (KR); Seung-Jun Yoon, Ichon-shi (KR)

(73) Assignee: Pantech Co., Ltd., Seoul (KR)

( * ) Notice: Subject to any disclaimer, the term of this patent is extended or adjusted under 35 U.S.C. 154(b) by 1575 days.

(21) Appl. No.: 11/025,987

(22) Filed: Jan. 3, 2005

(65) Prior Publication Data

US 2005/0228968 A1   Oct. 13, 2005

(30) Foreign Application Priority Data

Mar. 29, 2004   (KR) .................. 10-2004-0021183

(51) Int. Cl.
*G06F 9/45* (2006.01)
(52) U.S. Cl.
USPC .............. 717/100; 717/140; 712/202; 713/2
(58) Field of Classification Search
USPC ................ 712/202; 713/2, 1; 717/100, 140
See application file for complete search history.

(56) References Cited

U.S. PATENT DOCUMENTS

| | | | |
|---|---|---|---|
| 6,157,999 A * | 12/2000 | Rossbach et al. ............. 712/243 |
| 6,170,998 B1 | 1/2001 | Yamamoto et al. | |
| 6,289,434 B1 * | 9/2001 | Roy ................................ 712/32 |
| 6,363,473 B1 * | 3/2002 | Volentine et al. ............. 712/202 |
| 6,484,289 B1 * | 11/2002 | Hsu .............................. 714/820 |
| 6,493,816 B1 * | 12/2002 | Munroe et al. ................ 711/209 |
| 6,553,426 B2 | 4/2003 | Hölzle et al. | |
| 6,662,298 B2 * | 12/2003 | Heller ............................. 713/2 |
| 6,839,835 B2 * | 1/2005 | Kawade et al. ................ 713/2 |
| 7,159,105 B2 * | 1/2007 | Rothman et al. .............. 713/1 |
| 7,181,608 B2 * | 2/2007 | Fallon et al. ................... 713/2 |

(Continued)

FOREIGN PATENT DOCUMENTS

| CN | 1035571 A | 9/1989 |
|---|---|---|
| CN | 1138172 A | 12/1996 |

(Continued)

OTHER PUBLICATIONS

Mucci et al. "The CacheBench Report", 1998, University of Tennessee Computer Science Tech Report, retrieved from: http://icl.cs.utk.edu/projects/llcbench/cachebench.pdf.*

(Continued)

*Primary Examiner* — Chat Do
*Assistant Examiner* — Lynda Dinh
(74) *Attorney, Agent, or Firm* — H.C. Park & Associates, PLC

(57) ABSTRACT

An apparatus and method for initializing system global variables by using a multiple load/store instruction is disclosed. The apparatus includes: a first storing unit for storing a system global variable initialization function and initialization functions using multiple load/store instruction; a second storing unit for storing a return address; a control unit for storing a first return address to the second storing unit when the system global variable initialization function is called for initializing the system global variable, initializing the system global variables by calling the initialization functions using multiple load/store instruction while performing the system global variable function and performing a rest of system global variable initialization function by finding and executing an execution sequence based on the first return address stored in the second storing unit; and a third storing unit for storing the system global variables initialized according to the control unit.

16 Claims, 6 Drawing Sheets

(56) References Cited

U.S. PATENT DOCUMENTS

| | | | |
|---|---|---|---|
| 7,251,811 B2 * | 7/2007 | Rosner et al. | 717/138 |
| 7,325,176 B2 * | 1/2008 | Larson et al. | 714/718 |
| 7,340,561 B2 * | 3/2008 | Collins | 711/105 |
| 7,464,243 B2 * | 12/2008 | Haridas et al. | 711/170 |
| 2002/0161993 A1 * | 10/2002 | Chan et al. | 713/2 |
| 2003/0018846 A1 * | 1/2003 | Fanning | 711/5 |
| 2004/0143752 A1 * | 7/2004 | Kumar | 713/200 |
| 2005/0027940 A1 * | 2/2005 | Zimmer et al. | 711/117 |

FOREIGN PATENT DOCUMENTS

| | | |
|---|---|---|
| CN | 1234549 A | 11/1999 |
| KR | 10-2004-0008552 | 1/2004 |
| KR | 10-2005-0039954 | 5/2005 |

OTHER PUBLICATIONS

Prinz et al. "C Pocket Reference", 2003, O'Reilly, pp. 109-110.*
Jones et al. "Sams Teach Yourself C in 21 days", 2003, Sams Publishing, pp. 579-580.*

* cited by examiner

APPARATUS AND METHOD FOR INITIALIZING SYSTEM GLOBAL VARIABLES BY USING MULTIPLE LOAD/STORE INSTRUCTIONS

FIELD OF THE INVENTION

The present invention relates to an apparatus and a method for initializing system global variables by using a multiple load/store instruction; and, more particularly, to an apparatus and a method for initializing system global variables by storing a return address of a function initializing system global variables into common registers and using a multiple load/store instruction in order to reduce initialization time.

DESCRIPTION OF RELATED ARTS

A system having a central processing unit (CPU) such as a wireless communication terminal performs several initialization processes when the system is powered on or a reset button of the system is activated. During the initialization processes, a mess amount of system global variables of software programs operating and controlling the system are initialized. Accordingly, the system spends comparatively long time for performing the initialization processes. The system global variables can be divided into two categories such as zero initialization data (ZI data) which is initialized into 0 and read/write data (RW data) which is initialized into a predetermined data.

In a conventional method for initializing the system global variable is performed before an operating system of the system is initialized. Therefore, a function including a multiple load/store instruction cannot be used since the function would even clear the return address of the function itself, which is stored in a stack, and the stack is also a part of the global variables.

The multiple load instruction reads multiple bytes of data and the multiple store instruction stores the multiple bytes of data. That is, the multiple load/store instruction processes data in a unit of a predetermined number of bytes at once, to increase a process time of load and store operation. However, a "memset" function using a STM instruction of C programming language cannot be used for initializing the system global variable since the operating system is initialized after the system global variables are initialized in the conventional method.

Accordingly, the conventional method uses "for-loop" statement for initializing the system global variables as follows.

```
void init_ram(void)
{
    int *a;
    for(a= start address of ZI data; a< end address
        of ZI data; a++)
    {
        *a=0;
    }
    for(a= start address of RW data; a< end address
        of RW data; a++)
    {
        *a=*(address containing a predetermined value for
            initializing ++);
    }
}
```

As shown, the function void init_ram(void) initializes the ZI data and the RW data by using "for" statement. The "for" statement reads and processes the ZI and the RW data by one word at a time. Accordingly, the system spends comparatively long time for the initializing processes compared to the system using multiple load/store instructions.

As mentioned above, there is a time delay occurred for initializing the system global variables when the system is powered on or the system is reset. The time delay is increased corresponding to the size and the complexity of the software programs operating and controlling the system. Therefore, the time delay problem would be more serious since the size and the complexity of the software program will be incredibly increased according to rapid development of electrical systems.

SUMMARY OF THE INVENTION

It is, therefore, an object of the present invention to provide an apparatus and a method initializing system global variables by using a multiple load/store instruction in order to reduce time for initialization of system global variables.

It is another object of the present invention to provide an apparatus and a method for initializing system global variables by storing a return address into common registers.

In accordance with one aspect of the present invention, there is provided an apparatus for initializing system global variables by using multiple load/store instruction, the apparatus including: a first storing unit for storing a system global variable and initialization functions using multiple load/store instruction; a second storing unit for storing a return address; a control unit for storing a first return address of the system global variable initialization function to the second storing unit when the system global variable initialization function is called for initializing the system global variable, initializing the system global variables by calling the initialization functions using multiple load/store instruction during performing the system global variable function and performing a rest of system global variable initialization function by finding and executing an execution sequence based on the first return address stored in the second storing unit; and a third storing unit for storing the system global variables initialized according to the control unit.

In accordance with another aspect of the present invention, there is provided a method for initializing system global variables by using multiple load/store instruction, the method comprising the steps of: a) calling a system global variable initialization function when a control unit of a system starts initializing the system global variables; b) storing a return address of the system global variable initialization function in a return general-purpose register in a storing unit which is not initialized by the control unit of the system; c) calling an initializing function using the multiple load/store instruction during performing the system global variable initialization function and initializing the system global variables; and d) performing a rest of the system global variable initialization function by finding and executing an execution sequence based on the first return address stored in the storing unit after completing performing the initialization function.

BRIEF DESCRIPTION OF THE DRAWINGS

The above and other objects and features of the present invention will be better understood with regard to the following description of the preferred embodiments given in conjunction with the accompanying drawings, in which.

DETAILED DESCRIPTION OF THE INVENTION

Hereinafter, an apparatus and a method for initializing system global variables in accordance with a preferred embodiment of the present invention will be described in more detail with reference to the accompanying drawings.

Figure 1:
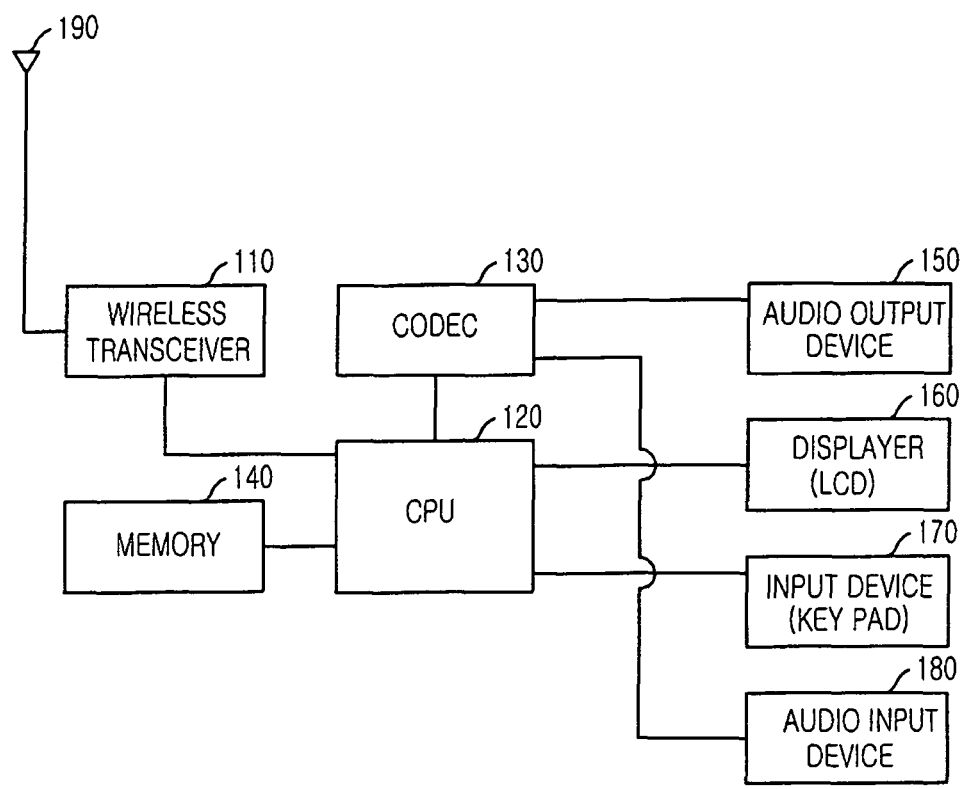
FIG. 1 is a block diagram showing a wireless communication terminal having an apparatus for initializing a system global variable by using a multiple load/store instruction in accordance with a preferred embodiment of the present invention.
Figure 2:
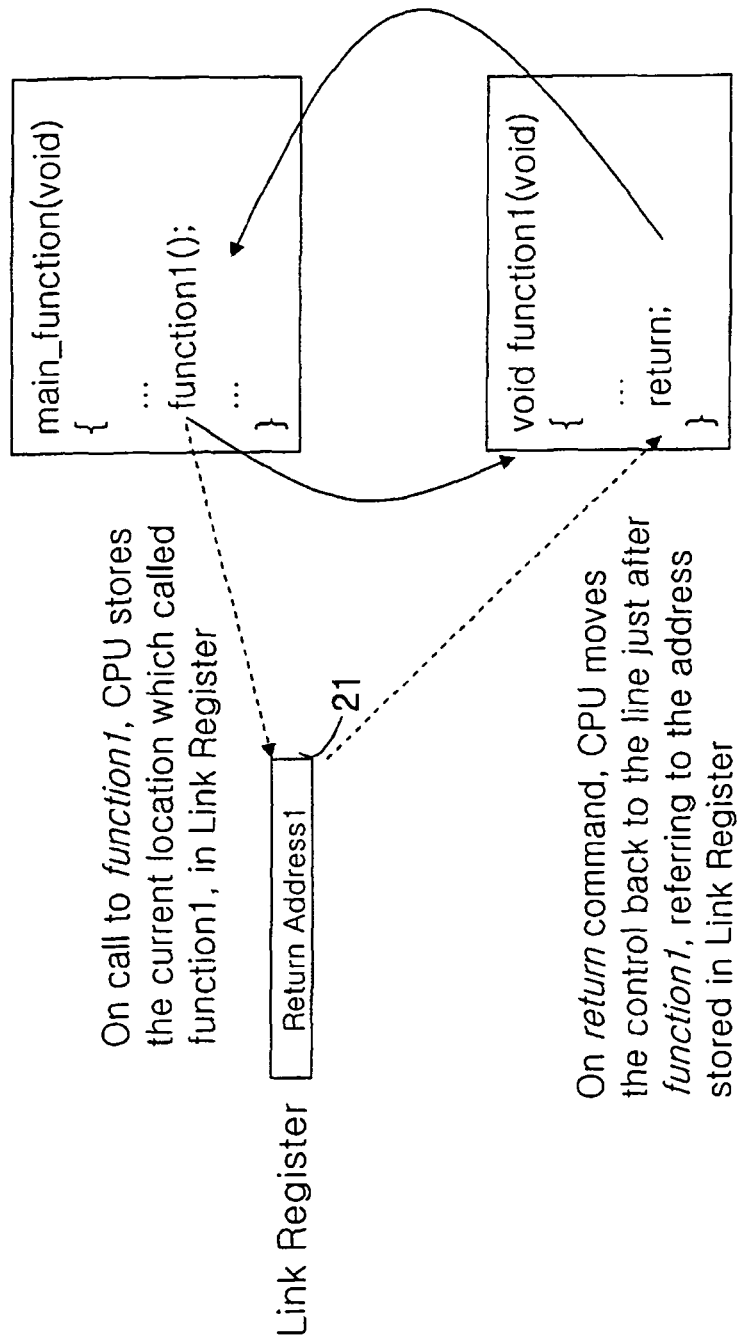
FIG. 2-5 is a view for explaining operations of calling functions and storing returning address in accordance with a preferred embodiment of the present invention.

FIG. 1 is a block diagram showing a wireless communication terminal having an apparatus for initializing a system global variable by using a block input/output instruction in accordance with a preferred embodiment of the present invention.

As shown, the wireless communication terminal 100 having the apparatus for initializing the system global variables includes a wireless transceiver 110, a central processing unit 120 (CPU), a compression/decompression (CODEC) 130, a memory 140, an audio output device 150, a displayer 160, an input device (key pad) 170, an audio input device 180 and an antenna 190.

The wireless transceiver 110 receives and transmits a radio frequency signal through the antenna 190.

The CPU 120 controls operations of the wireless communication terminal 100. In detail, the CPU 120 stores a return address of a system global variable initialization function when the wireless communication terminal 100 is powered on and the CPU 120 calls the initialization function using multiple load/store instructions for initializing the system global variables. Furthermore, the CPU 120 controls execution sequence of operating the wireless communication terminal 100 including the system global variable initialization function and the initialization function based on to the stored return address.

The compression/decompression (CODEC) 130 converts a radio frequency signal from the wireless transceiver 110 into an audio data and outputs the audio data through the audio output device 180. Furthermore, the CODEC 130 converts a voice signal inputted from an audio input device 180 into a digital data and transmits the digital data to the CPU 120 and transmitting the digital data through the wireless transceiver 110.

The memory 140 stores programs operating and controlling the wireless communication terminal 100, file systems of images, characters and icons, the system global variable initialization function and the initialization function using multiple load/store instructions. The memory 140 also stores initialized system global variable according to the CPU 120.

The audio output device 150 outputs audio data included the radio frequency signal from the wireless transceiver 110 according to a control of the CPU 120.

The displayer 160 displays data according to the control of the CPU 120.

The input device (key pad) 170 receives input data such as telephone number and menu selection information from a user.

The audio input device (mic) 180 receives a voice signal and transmits the input voice signal to the CODEC 130.

The CPU 120 includes a predetermined number of registers. Each of the registers is a small size of memory space temporally storing a instruction or data. That is, each of the registers is an inside memory of the CPU for storing a predetermined length of binary data for mathematical calculation, logical calculation, analysis and transmission. An access time of the register is comparatively faster than any other memories such as main memory, hard disk and floppy disk.

The registers are categorized according to it's purpose as general-purpose registers for temporarily storing a result of mathematical and logical calculations; a program counter for storing an address of currently executed instruction; and a link register for storing a return address of a function. ARM, one of the most widely used CPU for the wireless communication system includes 16 registers (0-15) and $15^{th}$ register is the link register.

When the wireless communication terminal is powered on or reset, the CPU of the wireless communication terminal executes a program having a set of instructions for controlling operations of the wireless communication terminal including initialization processes according to execution sequences of the program. The program includes various functions for initializing the system global variables, external devices and hardware of the wireless communication terminal system. When one of the functions is called during executing the program, the return address of the function is stored in the link register. After performing the called function, a rest of the program is executed by finding a start execution sequence of the rest of program, which is a next execution sequence to the execution sequence calling the called function, based on the return address stored in the link register. The link register stores the return address of the called function.

In case of calling a second function during executing a first function, a return address of the first function (calling function) is copied in a stack and a return address of the second function (called function) is written into the link register. An operation of calling function and storing return address is explained in detail by referring to FIGS. 2 to 5.

FIGS. 2 to 5 are views for explaining operation procedures of calling functions and storing returning address in accordance with a preferred embodiment of the present invention.

Figure 3:
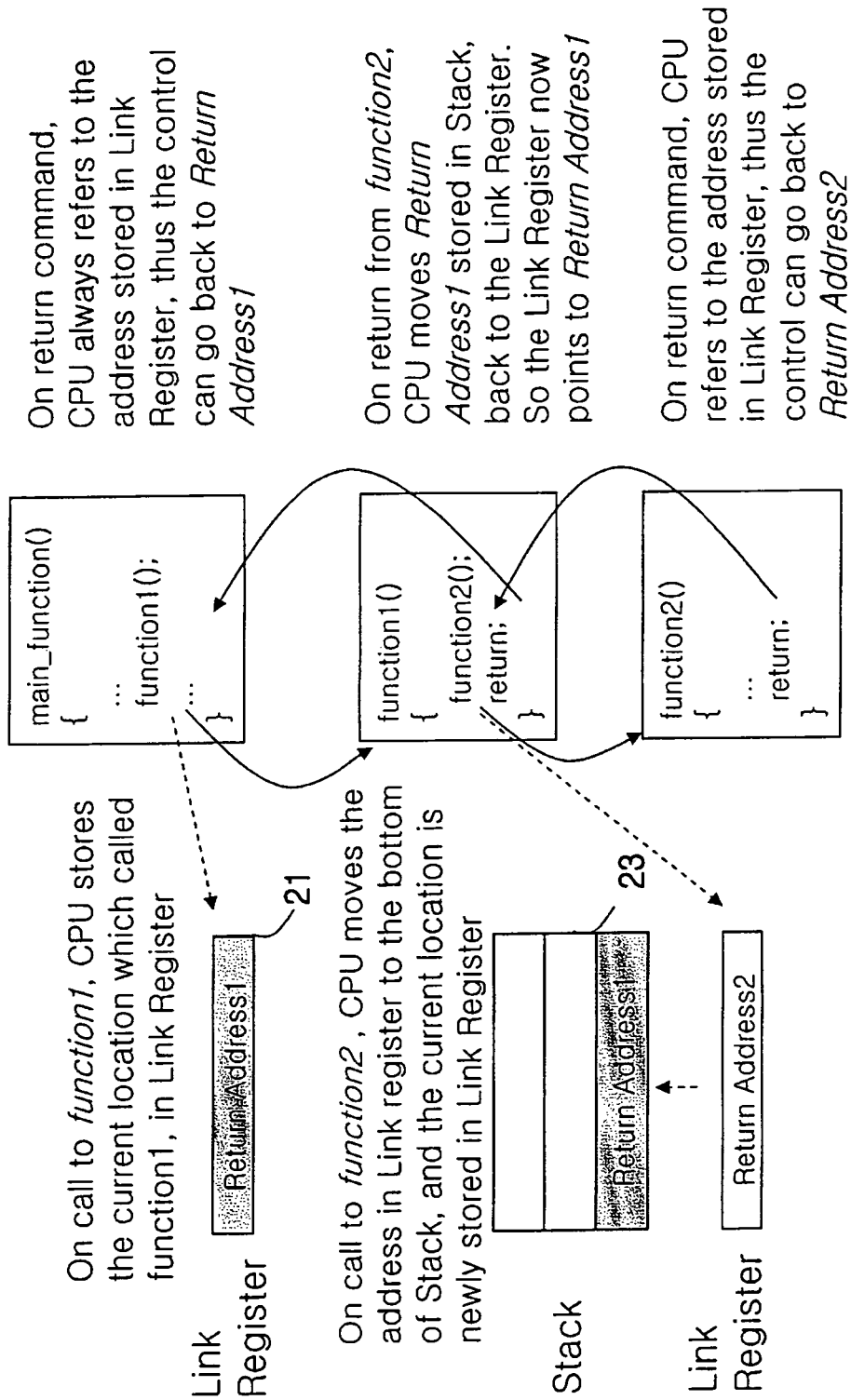

It assumes that a program including a plurality of functions and the program is executed according to execution sequences of the program. Referring to the FIG. 2, when a first function is called while executing the program, a first return address of the first function is stored in a link register 21. In FIG. 3, if a second function is called during performing the first function, the first return address stored in the link register 21 is stored in a stack 23 and a second return address of the second function is stored in the link register 21. Moreover, if a third function is called while the second function is being performed, the second return address stored in the linke register 21 is stored in the stack 23 and a third return address is newly stored in the link register 21. The return address stores a return address of lately called function and the stack 23 stores a plurality of return addresses of functions in reverse order of calling functions.

After completing the execution of a function, the link register 21 is firstly checked and an execution sequence is performed based on the return address stored in the link register for returning to a calling function of the function. After returning to the calling function, the stack 23 is checked. If there are any return addresses, a top of the stack is read as a return address of the calling function and the read return address is written into the link register. For example, after completing the third function, a rest of the second function is performed by executing an execution sequence based on the third return address stored in the link register. After returning to the second function based on the third return address, the stack 23 is checked and top of the stack 23 is read as the second return address for the second function. The second return address is written into the link register. After completing the second function, a rest of the first function is performed by executing an execution sequence based on the second return address stored in the link register and the top of the stack is read as the first return address and written into the link register. Finally, when the first function is completely executed, a rest of the program calling the first function, is performed by executing the execution sequence based on the first return address stored in the link register.

In the present invention, a program controlling the wireless communication terminal includes a system global variable initialization function and an initialization function. While executing the program, the program calls the system global variable initialization function and an initialization function using a multiple load/store instruction. In addition, the system global variable initialization function calls the initialization function. When the program calls the system global variable initialization function, a first return address of the system global variable initialization function is stored in the link register. Furthermore, when the system global variable initialization function calls the initialization function, the first return address stored in the return address is copied into another general-purpose register and a second return address of the initialization function is stored in the link register.

Figure 4:
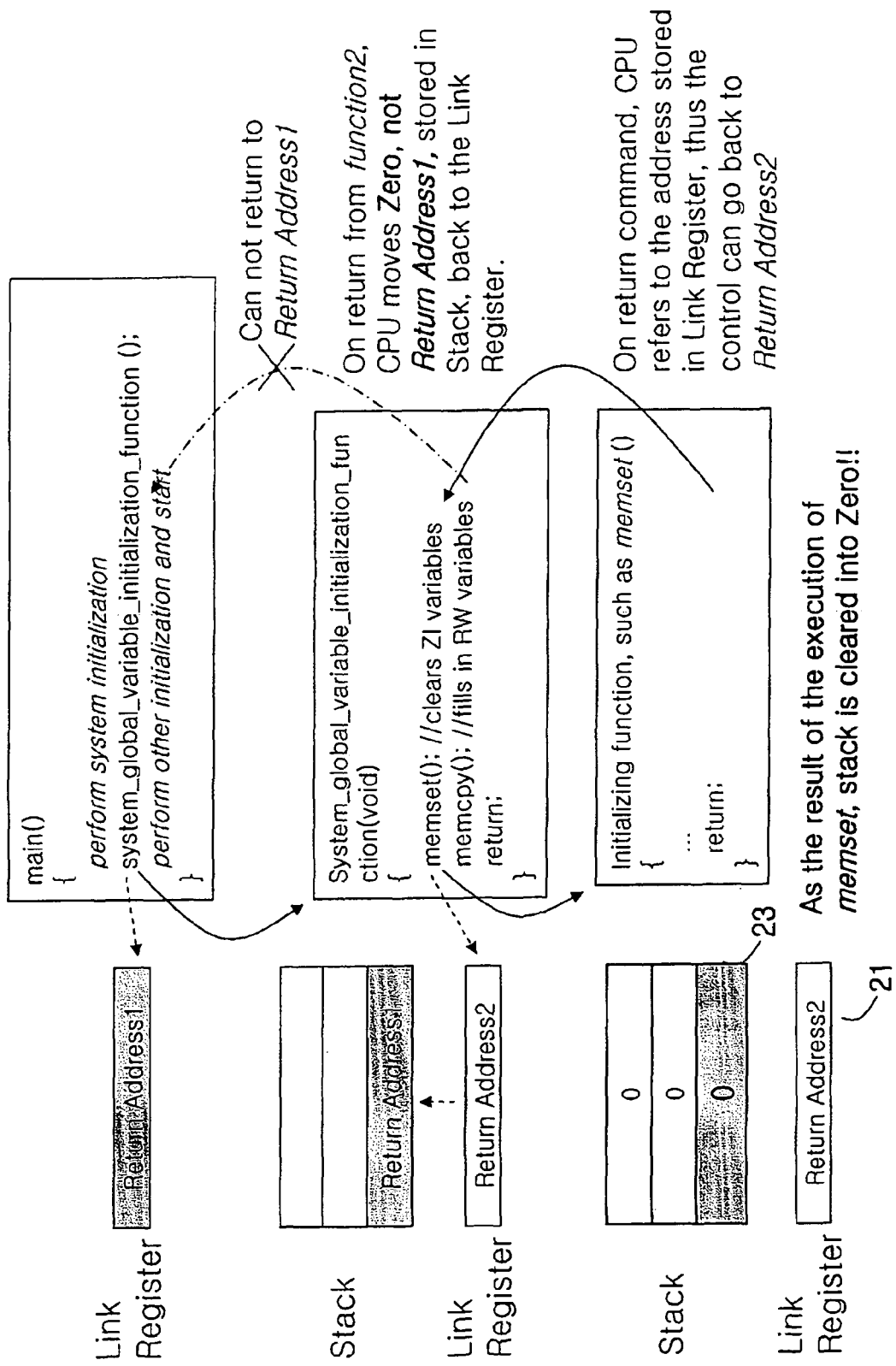

Conventionally, when a calling function for initializing system global variables calls a called function during performing the calling function, a return address of the called function is stored into the return address 21 and a link register of the calling function is copied into the stack 23. As depicted in FIG. 4, however, the stack 23 is initialized to have null data after initializing the system global variable by the called function since the stack 23 is also one of system global variables. Therefore, the rest of the calling function cannot be executed since the return address of the calling function, which has been stored in the stack 23, is also deleted. This explains why such function as 'memset' could not be used as initialization function conventionally, even though it is much faster than simple 'for-loop'.

For overcoming the above mentioned problem of the conventional method, the first return address of the system global variable initialization function is stored in another general-purpose register in the CPU before calling the initialization function using multiple load/store instruction or before storing the second return address of the initialization function at the link register. After performing the system global variable initialization function, the first return address stored in another general-purpose register 22 is re-stored into the link register 21 and the rest of the program is performed by finding and executing a next execution sequence of the program to the execution sequence calling the system global variable initialization function based on the stored first return address.

Figure 5:
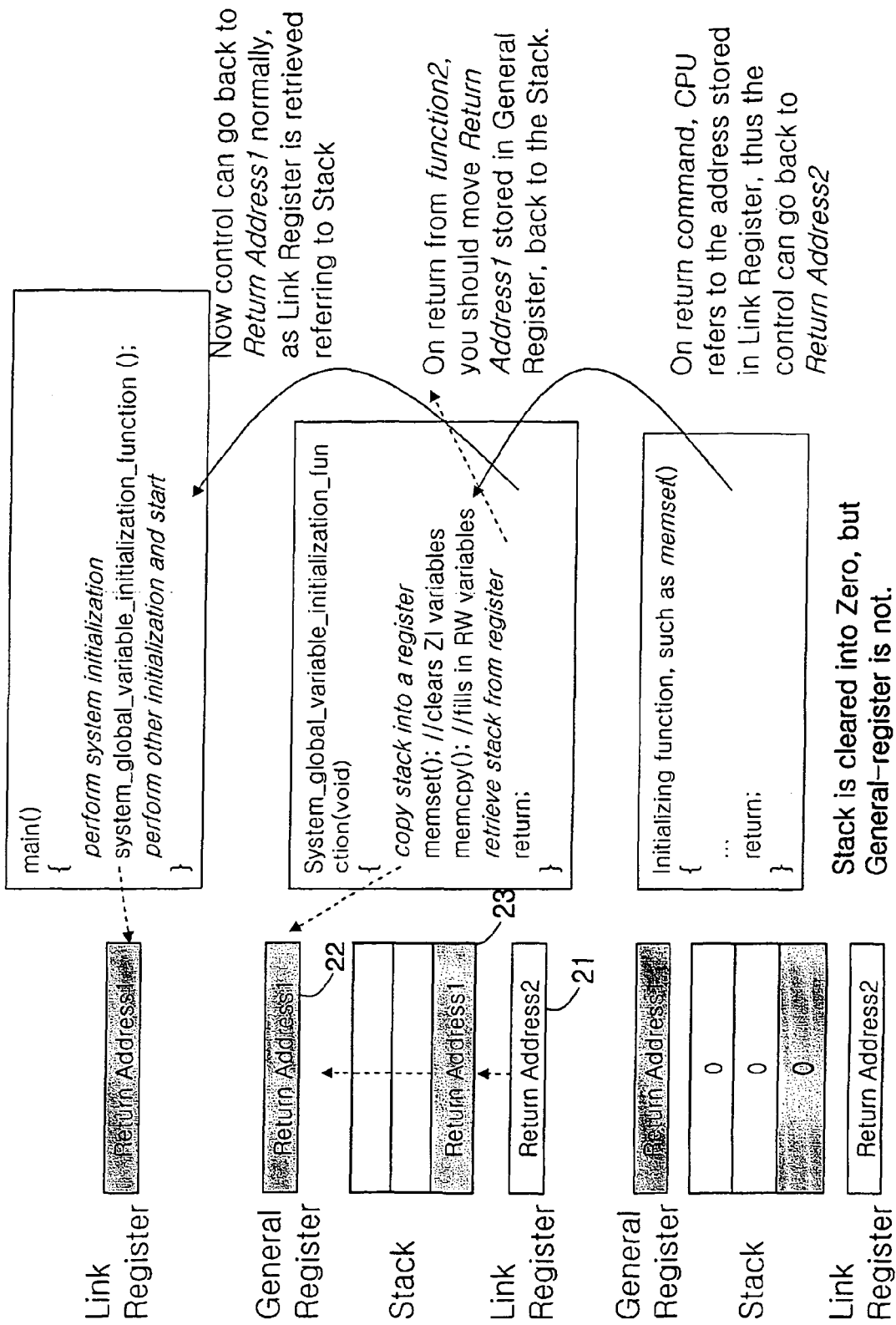

Referring to FIG. 5, operations of initialization procedure is explained in detail.

At first, the system global variable initialization function is called for performing initialization processes by the CPU 120 while the program controlling the wireless communication terminal is executing. The first return address of the system global variable initialization function is stored into the link register and, at the same time, the first return address stored in the return address is also copied into another general-purpose register in the CPU. If the initialization function is called while the system global variable initialization function is performed, the second return address of the initialization function is newly stored in the link register.

For another example, the system global variable initialization function is called for performing initialization processes by the CPU 126 during the program controlling the wireless communication terminal is executing. The first return address of the system global variable initialization function is stored in the link register 21. When an initialization function is called during the execution of the system global variable initialization function, the first return address of the system global variable initialization function is copied into another general-purpose register 22 of the CPU 12 and the second return address of the initialization function is stored in the link register 21.

After performing the initialization function, the rest of the system global variable initialization function is performed by finding and executing a next execution sequence to the execution sequence calling the initialization function based on the second return address stored in the link register 21. After returning to the system global variable initialization function, the first return address stored in another general-purpose register 22 is copied into the link register 21. After performing the rest of the system global variable initialization function, the rest of the program is performed by finding and executing the next executing sequence to the executing sequence calling the system global variable initialization function according to the first return address stored in the link register 21.

In a preferred embodiment of the present invention, the system global variable initialization function orderly calls a memset function and a memcpy function as the initialization functions. The memset function and the memcpy function initialize the system global variables by using the multiple load/store instructions in order to reduce a time for initializing system global variables. Any other functions using multiple load/store instruction can be used for initializing the system global variables instead of the memset function and the memcpy function.

The memory 140 includes a non-volatile memory such as ROM and a volatile memory RAM. The non-volatile memory stores the program of controlling the wireless communication terminal, a file system, images, characters and icons, the system global variable initialization function and the initialization function using block input/output instruction. The volatile memory stores the system global variables, which are initialized according to the control of the CPU 120.

The read only memory (ROM) is a memory device storing non-volatile data. The ROM allows to read stored data in high-speed but writing data in the ROM is very limited.

The random access memory (RAM) is a memory device allowing writing and reading data to/from memory elements. The RAM has advantages to allow a writing operation and reading operation at low cost, small size, low electric power consumption and high-speed access.

Figure 6:
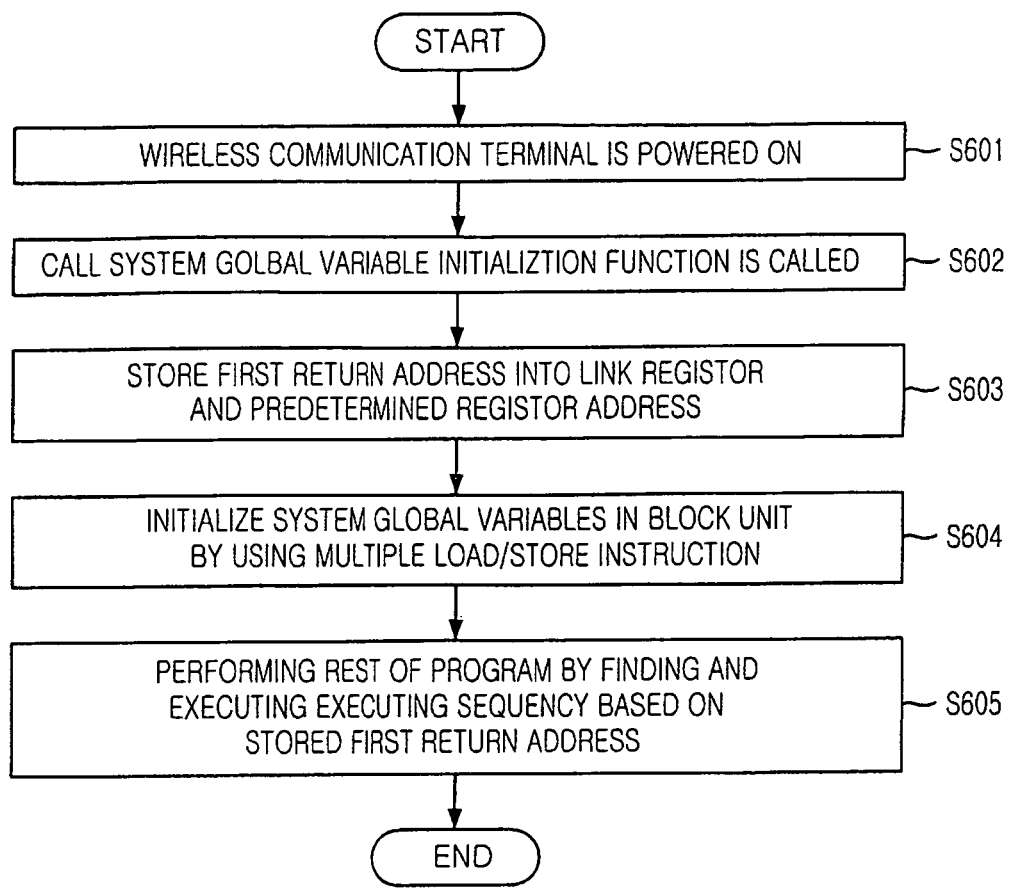
FIG. 6 is a flowchart showing operations of an apparatus and a method for initializing system global variable in accordance with a preferred embodiment of the present invention.

FIG. 6 is a flowchart showing operations of an apparatus and a method for initializing system global variable in accordance with a preferred embodiment of the present invention.

As shown, when a wireless communication terminal is powered on or reset, a program controlling operations of the wireless communication terminal is performed at step S601. The program calls a system global variable initialization function stored in a ROM for initializing system global variables at step S602.

The CPU stores a first return address of the system global variable initialization function in the return address and the code should be executed to copy that address in a free general-purpose register for performing the rest of the program after performing the system global variable initialization function at step S603. The rest of the program is performed by finding and executing a next execution sequence to the execution sequence calling the system global variable initialization function based on the first return address.

That is, the CPU stores the first return address of the system global variable initialization function in the return address when the program calls the system global variable initialization function. After the CPU stores the first return address into the return address, the code should be executed which stores that first return address in another general-purpose register.

As mentioned above, the first return address should be stored in other general-purpose register before calling the system global variable initialization function or the first return address should be stored after calling the system global variable initialization function and before storing the first return address in the return address.

After storing the first return address, the system global variables are initialized by calling an initialization function using multiple load/store instruction at step S604.

The system global variable initialization function (void init_ram(void)) and the initialization function using multiple load/store instruction (memset, memcpy) are shown as follows.

```
void init_ram(void)
{
    memset(start address of ZI data, 0, end addres of ZI data – start
        address of ZI data +1);
    memcpy(start address of RW data, address having initialization
        value, size of RW data)
}
```

The system global variable initialization function (void int_ram(void)) of the present invention calls the initialization functions memset function and memcpy function in order.

The memset function initializes system global variables to "0" by processing predetermined bytes of system global variable at once. Generally this function is implemented using multiple load/store instruction for speed-up. That is, the ZI data stored in a RAM of the wireless communication terminal is initialized in a block unit. In the preferred embodiment of the present invention, the memset function is used as an initialization function, but any other functions processing multiple bytes of data at each instruction, can be used.

The memcpy function is a function copying n bytes of data stored in a first memory location into a second memory location and is used in the preferred embodiment of the present invention for initializing the RW data. That is, the memcpy function reads the initialization value of the system global variables stored in the ROM and copies it to a corresponding memory location of RAM for initialization of system global variables.

When the system global variable initialization function calls the memset function, a second return address of the memset function is newly stored in the link register. After performing the memset function, the rest of the system global variable is performed by finding and executing next execution sequence to an executing sequence calling the memset function based on the second return address stored in the return address.

The call of and the return from the memcpy function is done in the same way as the memset function.

After completing the execution of the system global variable initialization function, the CPU reads the first return address of the system global variable initialization function, which is stored in another general-purpose register. And the rest of the program is performed by finding and executing next execution sequence to an executing sequence calling the system global variable initialization function based on the first return address stored in another general-purpose register.

The present invention mentioned above can be applied to any electric device having a central process unit (CPU) supporting multiple load/store instruction. That is, the present invention can decrease a boot time of electric devices having the CPU such as a computer and a wireless communication terminal.

As mentioned above, the present invention can decrease a time spent for initializing system global variables by storing a return address in one of the general purpose registers in a central processing unit and using a multiple load/store instruction function.

The present invention contains subject matter related to Korean patent application No. KR 2004-0021183, filed in the Korean patent office on Mar. 29, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. An apparatus for initializing system global variables by using multiple load/store instruction, the apparatus comprising:
    a first storing unit to store a system global variable initialization function and an initialization function using multiple load/store instruction;
    a second storing unit to store a return address;
    a stack in a memory for initialization and a link register;
    a control unit to copy a first return address of the system global variable initialization function to the link register as a most recent return address of a currently called function, and to copy the first return address from the link register to the second storing unit when the system global variable initialization function is called for initializing the system global variables, to initialize the system global variables including the stack in a block unit of a predetermined number of bytes by calling the initialization function using multiple load/store instruction during performing the system global variable initialization function, to copy the first return address from the second storing unit to the stack after initializing the stack, wherein the link register stores a second return address of the initialization function as a most recent return address of a currently called function, to copy the first return address from the stack to the link register, and to perform a rest of a system initialization by finding and executing an execution sequence based on the first return address stored in the link register; and
    a third storing unit to store the system global variables initialized according to the control unit,
    wherein the second storing unit is a general-purpose register that is not initialized during the initializing the system global variables, and the link register is not initialized during the initializing the system global variables,
    wherein the control unit reads the first return address stored in the second storing unit and writes the first return address to the link register after performing the initialization function, and
    wherein the multiple load/store instruction comprises a memset function according to a C programming language, and reads or writes multiple bytes of data in a block unit of a predetermined number of bytes.

2. The apparatus of claim 1, wherein the second storing unit is a general-purpose register in the control unit.

3. The apparatus of claim 2, wherein the control unit stores the first return address of the system global variable initialization function in the second storing unit when the initialization function is called while the system global variable initialization function is performed, stores the second return address of the initialization function in the link register, initializes the system global variables including the stack by using multiple load/store instruction, and performs the rest of the system global variable initialization function by finding and executing an execution sequence based on the second return address stored in the link register.

4. The apparatus of claim 3, wherein the first storing unit, the second storing unit, the third storing unit and the control unit are included in a wireless communication terminal.

5. The apparatus of claim 3, wherein the first storing unit, the second storing unit, the third storing unit and the control unit are included in a computer, or in any other electrical devices.

6. The apparatus of claim 1, wherein the control unit stores second return address of the initialization function in the link register when the initialization function is called while performing the system global variable initialization function, initializes system global variables including the stack by using the multiple load/store instruction, and performs the rest of the system global variable initialization function by finding and executing an execution sequence based on the second return address in the link register.

7. The apparatus of claim 1, wherein the first storing unit is a read only memory (ROM) and the third storing unit is a random access memory (RAM).

8. The apparatus of claim 1, wherein the first return address stored in the second storing unit is protected when the multiple load/store instruction initializes the system global variables including the stack in the block unit of the predetermined number of bytes.

9. A method for initializing system global variables by using multiple load/store instruction, the method comprising the steps of:
  a) calling a system global variable initialization function when a control unit of a system starts initializing the system global variables;
  b) storing a first return address of the system global variable initialization function in a storing unit which is not initialized by the control unit of the system;
  c) calling an initializing function using the multiple load/store instruction while performing the system global variable initialization function and initializing the system global variables including a stack in a memory for initialization in a block unit of a predetermined number of bytes, wherein the step c) comprises:
    c-1) initializing zero initialization (ZI) data of the system global variables using multiple load/store instruction, which has a first byte length, by calling a function initializing ZI data, and
    c-2) initializing read/write (RW) data of the system global variables using multiple load/store instruction, which has a second byte length, by calling a function initializing RW data;
  d) copying the first return address stored in a general-purpose register included in the storing unit to the stack after initializing the stack, and copying the first return address from the stack into a link register after the completion of the initialization function using the multiple load/store instruction, wherein the first return address stored in the general-purpose register is copied to the link register after initializing the system global variables; and
  e) performing a rest of a system initialization by finding and executing an execution sequence based on the first return address,
  wherein the multiple load/store instruction comprises a memset function according to a C programming language, and reads or writes multiple bytes of data in a block unit of a predetermined number of bytes.

10. The method of claim 9, wherein in step b), the storing unit includes the general-purpose register, and the control unit stores the first return address in the link register and the general-purpose register when calling the system global variable initialization function.

11. The method of claim 10, wherein in step e), a second return address of the initialization function is stored in the link register when the initialization function is called while performing the system global variable initialization function, the system global variables including the stack are initialized by using the multiple load/store instruction, and the rest of the system global variable initialization function is performed by finding and executing an execution sequence based on the second return address stored in the link register.

12. The method of claim 9, wherein in step b) and c), the first return address of the system global variable initialization function stored in the link register is copied to the general-purpose register when the initialization function is called while performing the system global variable initialization function, a second return address of the initialization function is stored in the link register, the system global variables are initialized by using multiple load/store instruction, and the rest of the system global variable initialization function is performing by finding and executing an execution sequence based on the second return address stored in the link register.

13. The method of claim 9, wherein in the step c-1), the control unit calls the function initializing ZI data while performing the system global variable initialization function and the ZI data stored in a random access memory (RAM) is initialized using multiple load/store instruction.

14. The method of claim 9, wherein in the step c-2), the function initializing RW data reads a predetermined value stored in a read only memory (ROM) in a block unit and copies the predetermined value to a predetermined location of RW data located in a random access memory (RAM) using multiple load/store instruction for initializing RW data.

15. An apparatus for initializing system global variables by using multiple load/store instruction, the apparatus comprising:
  a first storing unit to store a system global variable initialization function and an initialization function using multiple load/store instruction;
  a second storing unit to store a return address;
  a stack in a memory for initialization and a link register;
  a control unit to copy a first return address of the system global variable initialization function to the link register as a most recent return address of a currently called function, and to copy the first return address from the link register to the second storing unit when the system global variable initialization function is called for initializing the system global variables, to initialize the system global variables including the stack in a block unit of a predetermined number of bytes by calling the initialization function using multiple load/store instruction during performing the system global variable initialization function, to copy the first return address from the second storing unit to the stack after initializing the stack, wherein the link register stores a second return address of the initialization function as a most recent return address of a currently called function, to read the first return address from the second storing unit after initializing the stack, to write the first return address retrieved from the second storing unit to the link register, and to perform a rest of a system initialization by finding and executing an execution sequence based on the first return address stored in the link register; and a third storing unit to store the system global variables initialized according to the control unit, wherein the control unit reads the first return address stored in the second storing unit and writes the first return address to the link register after performing the initialization function, wherein the second storing unit is a register that is not initialized during the initializing the system global variables, and the link register is not initialized during the initializing the system global variables, and wherein the multiple load/store instruction comprises a memset function or a memcpy function according to a C programming language, and reads or writes multiple bytes of data in a block unit of a predetermined number of bytes at once.

16. The apparatus of claim 15, wherein the control unit stores the first return address of the system global variable initialization function in the second storing unit when the initialization function is called while the system global variable initialization function is performed, stores second return address of the initialization function in the link register, initializes the system global variables including the stack by using multiple load/store instruction, and performs the rest of the system global variable initialization function by finding and executing an execution sequence based on the second return address stored in the link register.

* * * * *